United States Patent [19]
Joseph et al.

[11] Patent Number: 5,574,977
[45] Date of Patent: Nov. 12, 1996

[54] SYSTEM AND METHOD FOR PROVIDING PRIORITY ACCESS AND CHANNEL ASSIGNMENT IN A CELLULAR TELECOMMUNICATION SYSTEM

[75] Inventors: Robin S. Joseph, Ste. Anne de Bellevue; Michael Houde, St. Laurent, both of Canada

[73] Assignee: Telefonaktiebolaget LM Ericsson, Stockholm, Sweden

[21] Appl. No.: 423,798

[22] Filed: Apr. 17, 1995

[51] Int. Cl.$^6$ .............................. H04B 1/00; H04B 7/00
[52] U.S. Cl. ............................. 455/58.1; 455/54.1
[58] Field of Search ............................. 455/33.1, 34.1, 455/34.2, 53.1, 54.1, 56.1, 58.1; 379/58, 59

[56] References Cited

U.S. PATENT DOCUMENTS

| | | | |
|---|---|---|---|
| Re. 32,789 | 11/1988 | Lynk, Jr. et al. | 455/34.1 |
| 4,012,597 | 3/1977 | Lynk, Jr. et al. | 455/34.1 |
| 4,831,373 | 5/1989 | Hess | 455/34.1 |
| 5,025,254 | 6/1991 | Hess | 455/34.1 |
| 5,054,109 | 10/1991 | Blackburn | 455/34.1 |
| 5,081,671 | 1/1992 | Raith et al. | 379/60 |
| 5,125,102 | 6/1992 | Childress et al. | 455/9 |
| 5,134,714 | 7/1992 | Janzen et al. | 455/54.2 |
| 5,159,701 | 10/1992 | Barnes et al. | 455/15 |
| 5,175,867 | 12/1992 | Wejke et al. | 455/33.1 |
| 5,179,374 | 1/1993 | Winger | 340/825.06 |
| 5,189,734 | 2/1993 | Bailey et al. | 455/33.2 |
| 5,226,071 | 7/1993 | Bollinger et al. | 379/60 |
| 5,301,356 | 4/1994 | Bodin et al. | 455/33.2 |
| 5,371,780 | 12/1994 | Amitay | 455/34.1 |

*Primary Examiner*—Reinhard J. Eisenzopf
*Assistant Examiner*—Marsha D. Banks-Harold
*Attorney, Agent, or Firm*—Smith & Catlett, P.C.

[57] ABSTRACT

A system and method of providing users of a mobile cellular telecommunication network, who subscribe to priority service, with priority access to voice or traffic channels during periods of congestion on these channels. The system provides priority to designated priority users for call origination, call termination, and handoff to congested cells. When the network is not congested, any channel is available for use by any user, whether a designated priority user or not. During periods of congestion, the system enables a service provider to designate whether a reserved bank of channels, a queue technique, or a combination of both is to be utilized to provide priority access and channel assignment (PACA). Call requests are positioned in a queue according to the priority level of the associated subscriber, and by time of arrival within each priority level.

15 Claims, 5 Drawing Sheets

SYSTEM AND METHOD FOR PROVIDING PRIORITY ACCESS AND CHANNEL ASSIGNMENT IN A CELLULAR TELECOMMUNICATION SYSTEM

BACKGROUND OF THE INVENTION

1. Technical Field of the Invention

This invention relates to channel assignments in cellular telephone networks and more particularly, to a system and method for providing priority access and channel assignment (PACA) to designated subscribers.

2. Description of Related Art

The coverage area of a typical cellular telephone network is broken into individual cells. In highly populated metropolitan areas or in times of crisis, congestion occurs in these cells. Even in times of congestion, however, there is a need for some callers, such as providers of emergency services, to have priority for access and channel assignment. An existing prioritization implementation assigns permanently to designated priority users, hereinafter referred to as "PACA users", a bank of reserved channels for the sole use of PACA users. These channels are always reserved, regardless of whether or not the channels are currently needed by PACA users. These reserved channels are utilized either for calls to, or calls from, PACA users. The reserved channels are also available for handoff when a PACA user moves from one cell to another.

The Telecommunications Industry Association (TIA) is currently developing an end user interface standard known as IS-53A. The proposed IS-53A standard does not require a bank of reserved channels, but rather assigns available channels to users based on a predetermined prioritization scheme. The standard specifies that requests for voice or traffic channels by PACA users are queued, and the system handles the queue on a priority and first-come, first-served basis. Thus, as a channel becomes available, it is assigned to the first requesting user having the highest priority level. The proposed IS-53A standard is hereby incorporated by reference herein.

There are several shortcomings with the approach as put forth in the proposed IS-53A standard. First, the queuing approach is not supported by the current air interface. Under the standard, if a mobile subscriber tries to make a call when the networks are congested, he is placed in a queue to wait for an available voice channel. However, without an available voice channel, there is no way for the telecommunication system to tell the subscriber that he is in a queue and that his call will be processed when a channel is available. The subscriber has no way of knowing whether he is waiting for a voice channel, or whether he has lost his transmission connection. Additionally, the standard is only applicable for initiating calls, and does not solve the problem of call termination or prioritization in handoff situations.

U.S. Pat. No. 5,226,071 to Bolliger et al. (Bolliger) discloses a wireless telecommunications system in which call path resources are allocated in an orderly manner by queuing call requests during, for example, channel unavailability, and assigning channels to queued call requests as channels become available. Bolliger is, in essence, a patent on the proposed IS-53A queuing approach. A plurality of queues are provided for different locations within the service area so that, as a mobile station moves, its call request is sequentially placed in different queues. Bolliger states that it is usable for queuing both incoming and outgoing calls, however, there is no disclosure of how such a system for incoming calls would be implemented, and it is not clear that there is any advantage for a mobile station to be placed in a queue for incoming calls.

Since Bolliger is limited to a system based solely on queues, it suffers from the same disadvantages as the proposed IS-53A standard described above. For example, Bolliger does not provide any method of informing a subscriber that he is in a queue. Also, although Bolliger discusses removing a call request from one queue and placing the request in a second queue whenever a mobile station waiting for a voice channel moves from one cell to another, Bolliger cannot be utilized for handoff of an active call since the call would have to be interrupted and placed in a queue whenever a mobile station moved from one cell to another.

Review of each of the foregoing references reveals no disclosure or suggestion of a system or method such as that described and claimed herein.

It would be a distinct advantage to have a system that is capable of utilizing a bank of reserved channels or a combination of reserved channels and queues to provide priority access to PACA users, whether the PACA user is involved in a call origination, call termination, or handoff situation. Such a system would enable a service provider to designate whether to utilize a bank of reserved channels, a queue technique, or a combination of the two for providing priority access to PACA users. The present invention provides such a system.

SUMMARY OF THE INVENTION

The present invention enables PACA users, who subscribe to priority service, to gain access to voice or traffic channels even though there is congestion on these channels. The present invention may either use a reserved bank of PACA channels or use a queue technique to process call requests during periods of congestion. The invention provides priority to designated priority users for call origination, call termination, and for handoff to congested cells. When the network is not congested, any channel is available for use by any user, whether a designated priority user or not. During periods of congestion, the service provider may designate that the system reserve a bank of channels for the exclusive use of designated PACA users. The service provider may also designate the use of a queue technique which assigns channels according to the user's priority level and the time of arrival of the call request. PACA users with the highest priority level are assigned a channel first. PACA users within each priority level are assigned a channel on a first-come, first-served basis. The present invention enhances the availability of channels to cellular telephone users and can be utilized to ensure priority service to emergency services such as police forces.

Thus, in one aspect the present invention is a system for providing a mobile telephone user with priority access to a cellular telecommunications network having a plurality of subscribers, and assigning channels to said user on a priority basis when there is channel congestion in the network. The system comprises means for determining a priority level for the user and the plurality of subscribers, means for determining a level of channel congestion, means for reserving a bank of channels, means for queuing call requests from the user and the plurality of subscribers, and means for selectively assigning a reserved channel to the user, or queuing a call request from the user with call requests from the plurality of subscribers, while awaiting an available channel.

In another aspect, the present invention is a method of providing a mobile telephone user with priority access to a cellular telecommunications network having a plurality of subscribers, and assigning a channel to the user on a priority basis when there is channel congestion in the network. The method begins by determining a priority level for the user and each of the plurality of subscribers. Next, a level of channel congestion is determined, and the service provider designates whether to utilize a reserved bank of channels, a queuing technique, or both. If both, the technique with precedence is designated. If a bank of channels is utilized, the channel bank is reserved. Next, call requests from the user and the plurality of subscribers are queued. Finally, the method includes selectively assigning a reserved channel to the user, or queuing a call request from the user with call requests from the plurality of subscribers, while awaiting an available channel.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In one embodiment of the present invention, any of the channels in a cellular telephone network are available to any user during periods of uncongested operation. In case of congestion, when a PACA user receives a call or is handed off to another cell, the cellular system gives precedence to this subscriber by comparing the priority level of the PACA user with non-PACA users and other PACA users since there may be multiple levels of precedence. Priority is evaluated, and channel assignment performed, by utilizing one of the following two methods, or their combination:

1. A bank of channels is reserved and assigned solely for the use of PACA users. The channel bank is further subdivided by PACA priority level, and is accessed according to a PACA_Information message parameter associated with the PACA user; and/or
2. A queuing mechanism is implemented to prevent reservation of a bank of channels in the absence of congestion. The channel bank may be utilized by both PACA and non-PACA users alike. As need arises (i.e., congestion), the channel bank is assigned, by priority, to PACA users. Queued requests for channels may be arbitrated utilizing one or a combination of the following PACA_Information message parameters:

A. PACA_Activation_Information which reports whether or not the PACA prioritization feature is activated by a particular user; and/or
   B. PACA_Priority_Level which reports the priority level of a specific PACA user relative to other PACA users, within a valid range of priority values.

As an example, the queuing mechanism of the present invention may be implemented with priorities ranging from a lowest priority of zero (0) to a highest priority of seven (7). Thus, a subscriber who is assigned a priority level of three (3) may, upon call origination, take priority over all PACA users having priority levels of 0 to 2, and over PACA users having a priority level of 3 who are later in the queue.

Any communication protocol may be utilized within the scope and intent of the present invention. The preferred embodiment described herein utilizes the most commonly used communications protocol in the cellular industry, IS-41, which is hereby incorporated by reference herein. The present invention does not require new messages to be added to the IS-41 communications protocol. A new parameter, PACA_Information, is added to IS-41.

Figure 1:
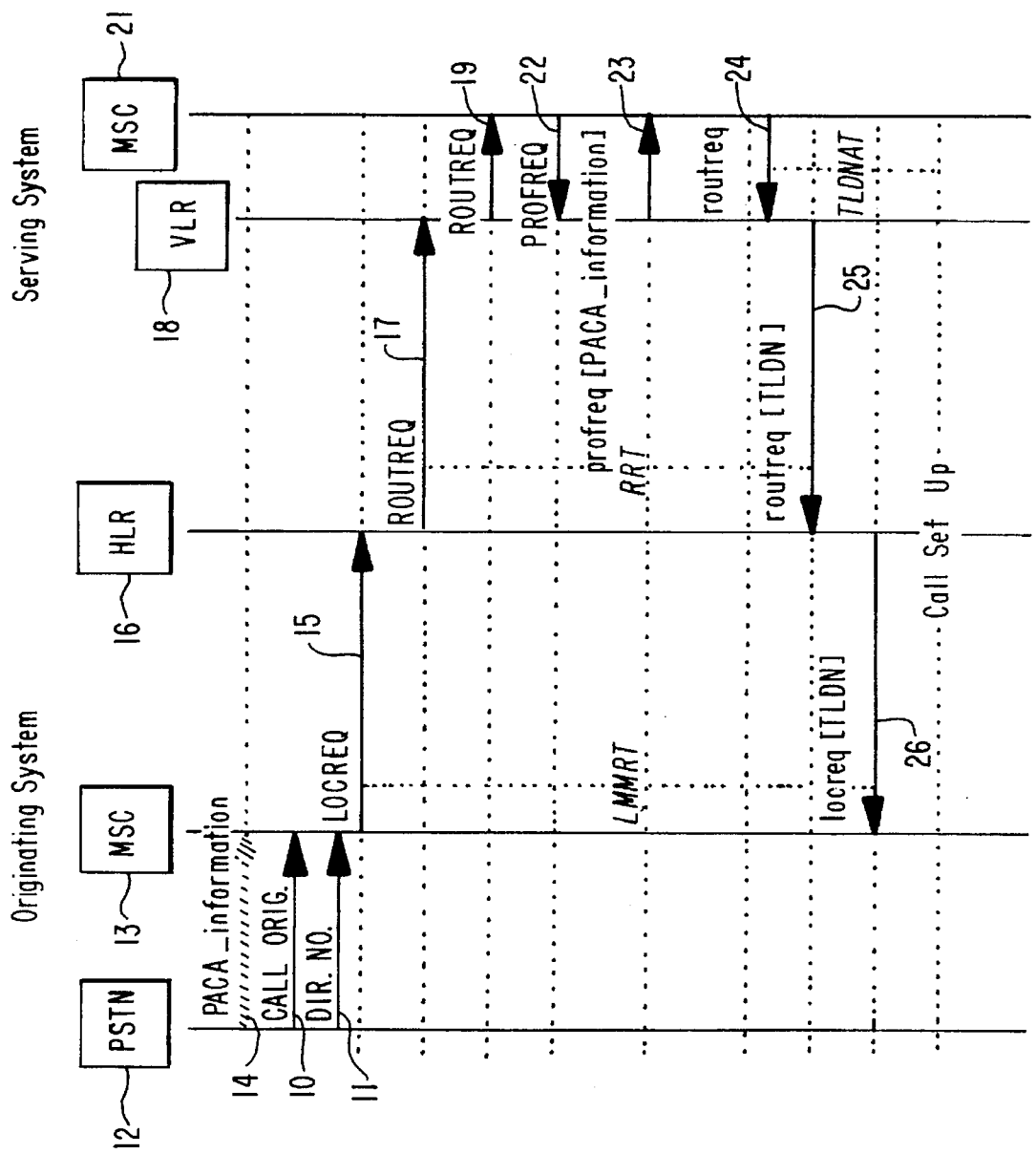
FIG. 1 is a message flow diagram illustrating the messages sent and received during call termination in the preferred embodiment of the present invention.

The present invention pertains primarily to the use of PACA information for call termination and for handoff of mobile stations operated by PACA users. Handoff may be with or without path minimization. FIG. 1 is a message flow diagram illustrating the messages sent and received during call termination in the exemplary preferred embodiment of the present invention. As previously noted, the preferred embodiment uses the IS-41 communications protocol, although other communications protocols could also be used. First, a call origination 10 and the dialed mobile address digits (i.e., directory number) 11 of the called mobile station are received from the public switched telephone network (PSTN) 12 at an originating MSC 13 using telephone protocols such as the Integrated Services User Part (ISUP), register signaling. A PACA_Information parameter 14 relating to the calling party may also be included. Next, the originating MSC 13 sends a "location request (LOCREQ) (invoke)" message 15 to a home location register (HLR) 16 associated with the called mobile station using the protocols defined by the IS-41 interconnection standard. The association of the HLR 16 to the called mobile station is made through the directory number 11. Next, if the directory number is assigned to a legitimate subscriber, and if call forward unconditional is not in effect, the HLR 16 sends a "routing request (ROUTREQ) (invoke)" message 17 to a visiting location register (VLR) 18 that last provided a registration notification (REGNOT) for the called mobile station. The VLR 18 then forwards the ROUTREQ (invoke) message at 19 to a currently serving MSC 21 where the mobile station may be found. The forwarded ROUTREQ (invoke) message 19 may include PACA_Information parameters on both the calling party and the called mobile station.

In reaction to the ROUTREQ (invoke) message 19, the serving MSC 21 consults its internal data structures to determine if the called mobile station is already engaged in a call within the serving MSC. In a first scenario, the mobile station is idle, and has not yet registered with the serving MSC 21. Therefore the mobile station is not yet known to the serving MSC. The serving MSC 21 then sends a profile request (PROFREQ) message 22 to the serving VLR 18 to obtain the service profile 23 of the subscriber associated with the called mobile station. The subscriber's service profile 23 is returned to the serving MSC 21 and includes default PACA information.

In a second scenario, the serving MSC 21 obtains the service profile 23 of the mobile subscriber prior to the termination attempt (e.g., at an earlier time when the mobile station first registered). Therefore the steps of obtaining the service profile from the VLR 18 and determining PACA information may be eliminated.

The serving MSC then allocates a temporary local directory number (TLDN) to the called mobile station and returns this information to the VLR 18 in a ROUTREQ (response) message 24. The VLR forwards the ROUTREQ (response) message with the TLDN at 25 to the HLR 16. When the ROUTREQ (response) message and TLDN are received by the HLR, the HLR constructs a location request (LOCREQ) (response) message 26 by adding a mobile identification number (MIN) and electronic serial number (ESN) of the called mobile station to the TLDN provided by the serving MSC 21. The HLR 16 then returns the LOCREQ (response) message 26 to the originating MSC 13. The originating MSC 13 establishes a voice path to the serving MSC 21 using existing interconnection protocols (e.g., SS-7) and the TLDN specified in the LOCREQ (response) message 26. At this point, channel assignment is performed utilizing the methods previously described.

An alternative method of establishing call priority may be utilized in the case where the calling party has PACA information as well as the called mobile station. In this case, the present invention may extend the calling party's PACA information to the called party. For example, if the calling party has a higher PACA priority level than the called party, the calling party information may override the called party information to ensure call delivery in accordance with the higher priority.

To achieve this, the PACA_Information parameter 14 related to the calling party is passed in the LOCREQ message 15 and the ROUTREQ message 17 and 19, and is compared with the PACA_Information parameter of the called party at channel assignment.

If termination is performed in accordance with pre-routing call setup, then channel assignment is performed when the serving MSC 21 allocates the TLDN using the methods previously described.

Figure 2:
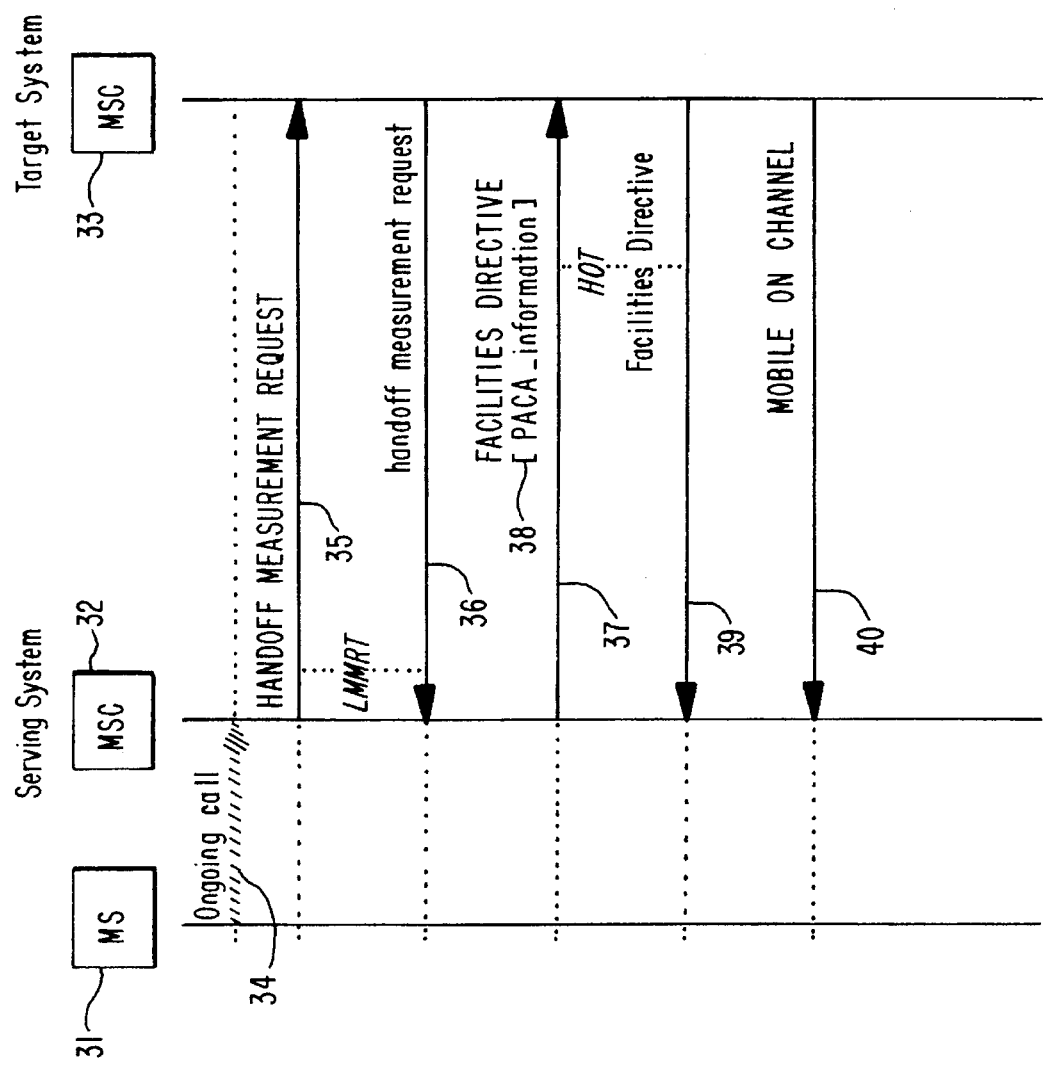
FIG. 2 is a message flow diagram illustrating the messages sent and received during handoff without path minimization while maintaining or making up a PACA oriented activation in the preferred embodiment of the present invention.

FIG. 2 illustrates the messages sent and received during handoff without path minimization while maintaining or making up a PACA oriented activation. The term "path minimization" is utilized herein to refer to a procedure by which a call from an originating MSC which is unsuccessful in reaching a called mobile station in a second MSC, and is forwarded to a third MSC, is routed back to the originating MSC before being forwarded to the third or subsequent MSCs. In the handoff situation of FIG. 2, a mobile station (MS) 31 associated with a PACA user moves from the service area of a currently serving mobile switching center (MSC) 32 into the service area of a neighboring target MSC 33. The PACA user is handed off in priority. In such a scenario, a call is ongoing at 34 when the currently serving system requires the neighboring target system to perform measurements on the mobile station signal. A "handoff measurement request (invoke)" message 35 is sent from the serving MSC 32 to the target MSC 33. The target MSC 33 returns a "handoff measurement request (results)" message 36 to the serving MSC 32. The serving MSC then sends a "facilities directive (invoke)" message 37 to the target MSC 33. The facilities directive (invoke) message 37 contains a PACA_Information parameter 38 which includes prioritization information on the mobile station 31.

The target MSC 33 then assesses whether a channel can be seized for the mobile station using the techniques described in connection with FIG. 1. If a channel can be seized, the target MSC 33 returns a "facilities directive (positive response)" message 39 to the serving MSC 32. The target MSC 33 then confirms that the mobile station 31 is now served by the target MSC by sending a "mobile on-channel (invoke)" message 40 to the old serving MSC 32.

In the case of a handoff to a system which cannot accommodate the request due to channel unavailability (i.e., congestion), the target system may check for an available channel from a reserved bank or the target system's response to the incoming facilities directive (invoke) message 38 is postponed until the queued request is processed. The postponement delay is timed out by system parameters to prevent impeding the system's handoff process.

Figure 3:
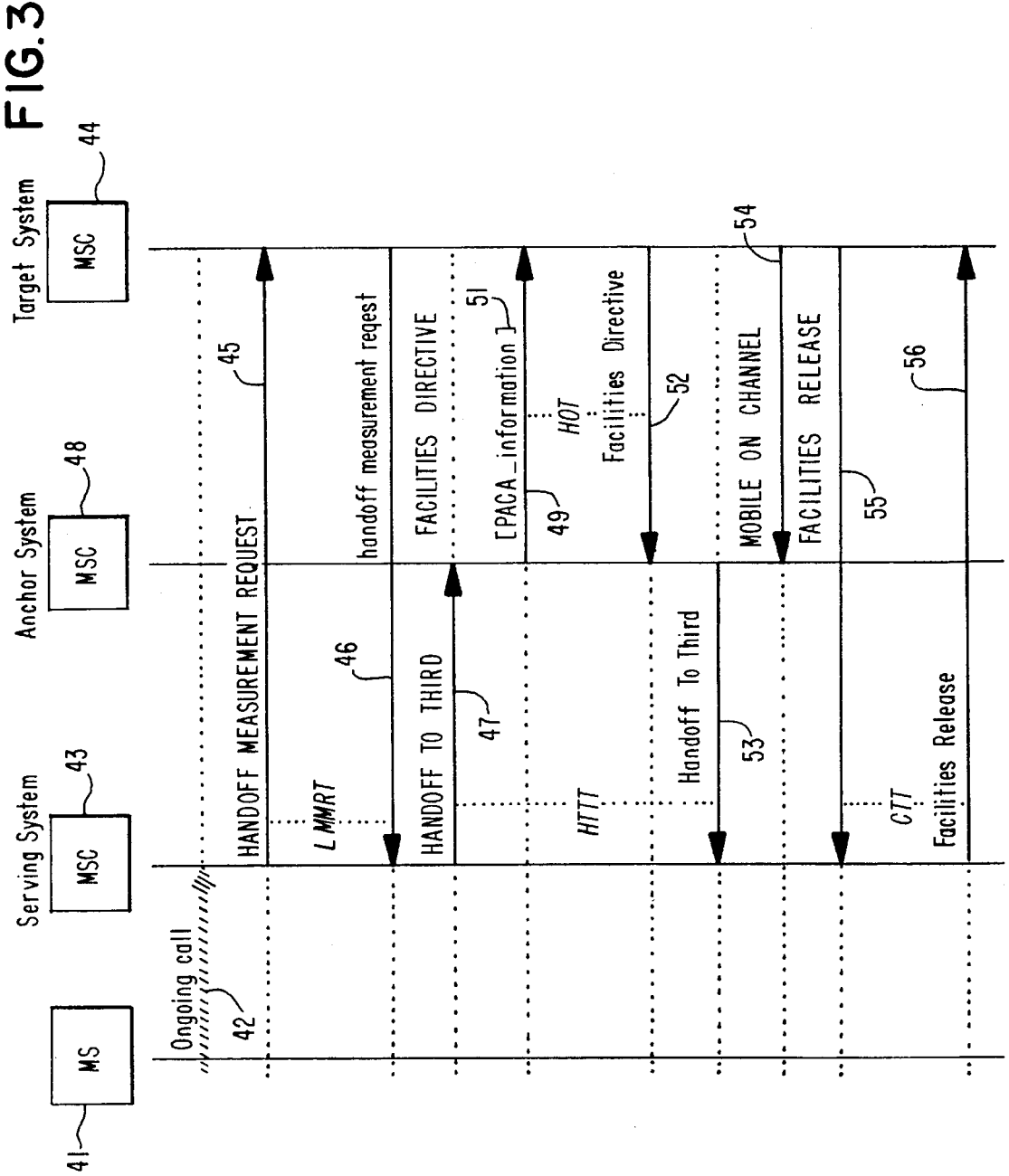
FIG. 3 is a message flow diagram illustrating the messages sent and received during handoff with path minimization while maintaining or making up a PACA-oriented activation in the preferred embodiment of the present invention.

FIG. 3 illustrates the steps occurring during handoff with path minimization while maintaining or making up a PACA-oriented activation. In such a scenario, a call from a mobile station 41 is ongoing at 42 when the currently serving MSC 43 requires a neighboring target MSC 44 to perform measurements on the mobile station signal. A handoff measurement request (invoke) message 45 is sent from the serving MSC 43 to the target MSC 44. The target MSC returns a handoff measurement request (results) message 46 to the serving MSC 43. The serving MSC then sends a "handoff to third (invoke)" message 47 to an anchor system MSC 48 instructing the anchor system MSC 48 to perform a "handoff to third (invoke)" procedure. The anchor system MSC then sends a facilities directive (invoke) message 49 to the target MSC 44. The anchor system MSC 48 populates the facilities directive (invoke) message 49 with a PACA_Information parameter 51 which includes the PACA_Priority_Level requested by the calling party at call origination.

The target MSC 44 then assesses whether a channel can be seized for the mobile station 41 using the techniques described in connection with FIG. 1. If a channel can be siezed, the target MSC 44 returns a facilities directive (positive response) message 52 to the anchor system MSC 48. In the case of a handoff to a system which cannot accommodate the request due to channel unavailability (i.e., congestion), the target system may check for an available channel from a reserved bank or the target system's response to the incoming facilities directive (invoke) message 49 is postponed until the queued request is processed. The postponement delay is timed out by system parameters to prevent impeding the system's handoff process.

Next, the anchor system MSC 48 sends a "handoff to third (response)" message 53 to the serving MSC 43 to assess whether handoff has been accepted by the target MSC 44. If handoff has been accepted by the target MSC 44, the target MSC confirms that the mobile station 41 is now being served by sending a mobile on channel (invoke) message 54 to the anchor system MSC 48. The target MSC 44 then requests the serving MSC 43 to free up the resources used for the mobile station 41 by sending a "facilities release (invoke)" message 55 to the serving MSC. The serving MSC then confirms resource release by returning a "facilities release (response)" message 56 to the target MSC.

Figure 4A:
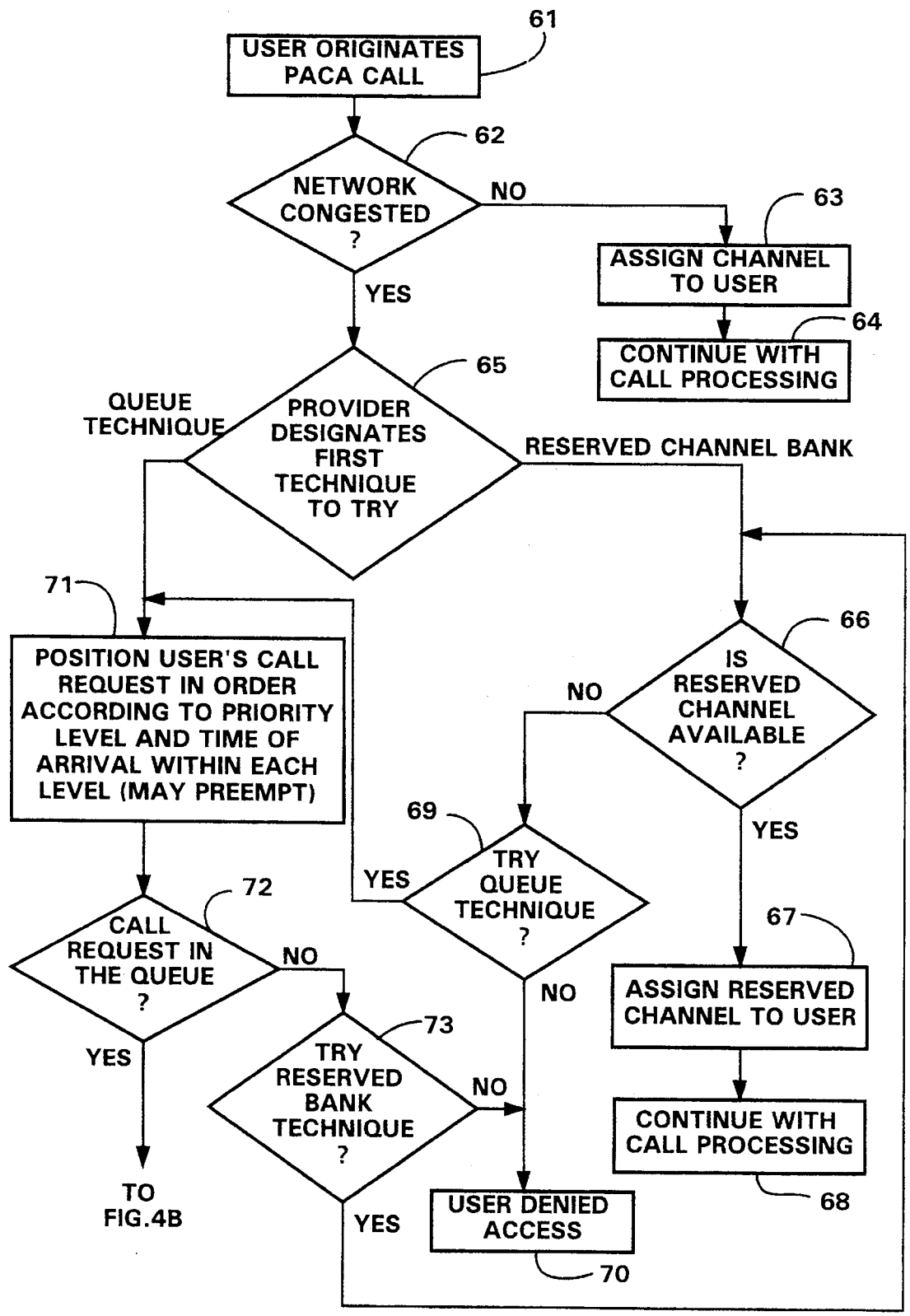
FIGS. 4A and 4B are a flow diagram illustrating the steps performed by the present invention when a user originates a PACA call during a period of channel congestion.
Figure 4B:
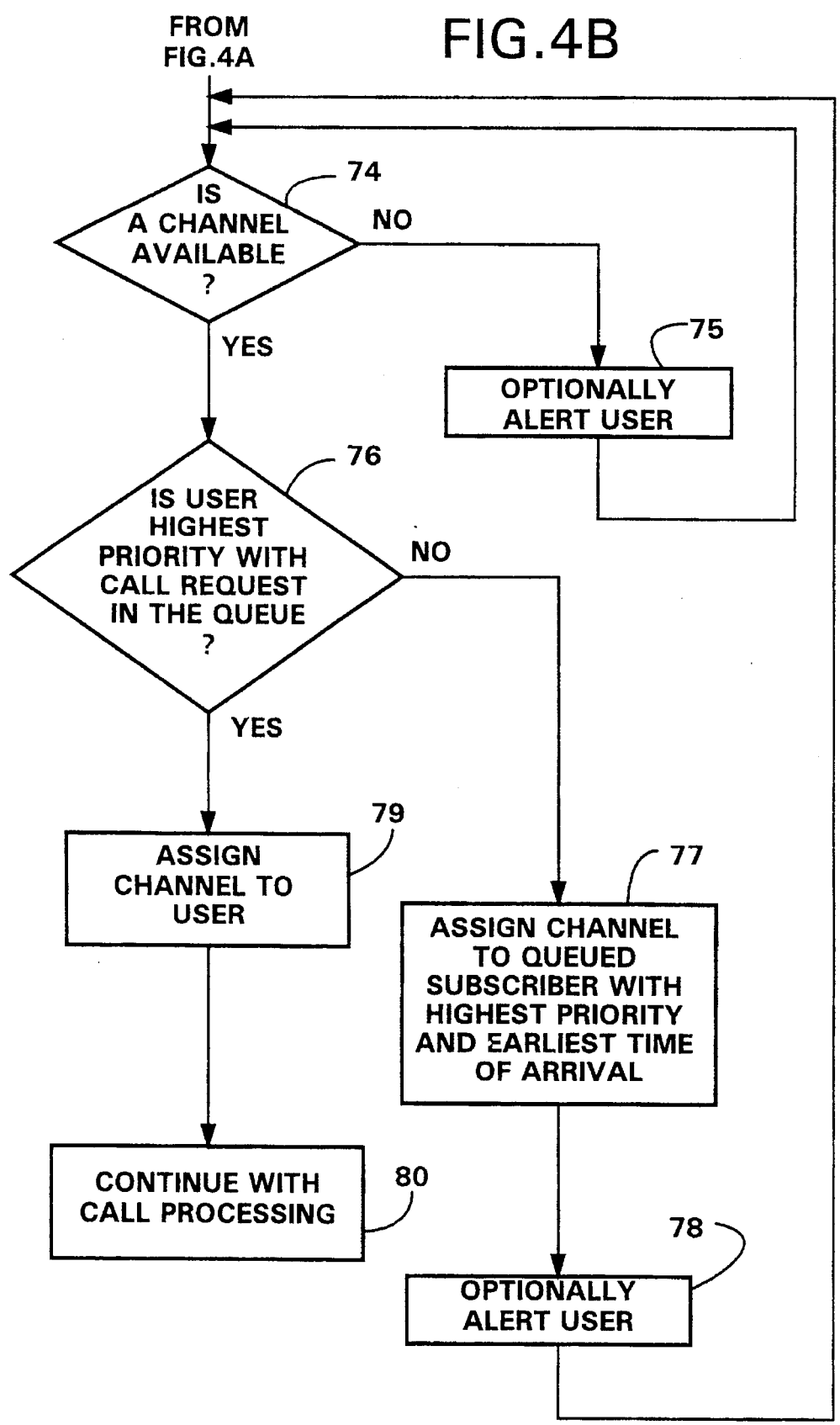

FIGS. 4A and 4B are a flow diagram illustrating the steps performed by the system of the present invention when a user originates a PACA call during a period of channel congestion. The system begins in FIG. 4A at step 61 where a user (i.e., a mobile subscriber) originates a PACA call. At step 62, the system determines whether or not the telecommunications network is experiencing channel congestion. If not, the system moves to step 63 and assigns a channel to the user, and then continues with call processing at step 64.

If, however, at step 62 it is determined that there is channel congestion in the network, then the system moves to step 65 where the service provider has designated the first technique to try, in order to obtain a channel for the user, in the event of channel congestion. If the service provider has designated that the system first access a reserved bank of channels, then the system moves to step 66 where it is determined whether or not a reserved channel is available. If a reserved channel is available, the system moves to step 67 where a reserved channel is assigned to the user, and then moves to step 68 and continues with call processing.

If, however, at step 66 it is determined that a reserved channel is not available, then the system moves to step 69 where it is determined whether or not the service provider has designated that the queue technique be utilized when reserved channels are not available. If the service provider has not designated that the queue technique be utilized, then the system denies access to the user at step 70. If the service provider has designated that the queue technique be utilized, then the system moves to step 71.

If, at step 65, the service provider has designated that the first technique to try, in order to assign a channel to the user, is the queue technique, then the system moves directly to step 71. At step 71, the call request from the user is positioned in priority order with call requests from other subscribers according to the user's and the other subscriber's PACA priority level and the time of arrival of each call request within each priority level. The user may preempt other mobile subscribers in the queue if the user has a higher priority. Conversely, the queue is of finite size, therefore the queue may be full of higher priority subscribers, and the user's call request will not be placed in the queue. At step 72, the system determines whether or not the user's call request fit in the queue, based on a predefined queue size. If not, the system moves to step 73 where it is determined whether or not the service provider has designated that the reserved channel bank technique be utilized when the user is not placed in the queue. If the service provider has not designated that the reserved channel bank technique be utilized, then the system moves to step 70 where the user is denied access. If the service provider has designated that the reserved channel bank technique be utilized, then the system moves to step 66 and begins that technique.

If it is determined at step 72 that the user's call request has been placed in the queue, then the system moves to step 74 in FIG. 4B. At step 74, the system determines whether or not a channel is available. If not, the user's call request remains in the queue, and the system may optionally alert the user with, for example, a distinctive ring signifying that the user's call is being processed, but the user's request is currently in a queue awaiting an available channel. The user may be alerted via any air interface standard such as, for example, IS-136 for time division multiple access (TDMA) systems, EIA/TIA-553 for analog mobile telephone systems (AMPS), or IS-54C for digital mobile telephone systems (D-AMPS). The system then returns to step 74 and continues to check for available channels. If there is an available channel, then the system moves to step 76 where it is determined whether or not the user is the highest priority subscriber with a call request in the queue, and is therefore, the next to receive an available channel. If not, the system moves to step 77 where the channel is assigned to the queued subscriber with the highest PACA priority level and the earliest time of arrival within the highest priority level in the queue. The system may optionally alert the user at step 78 whenever a channel is assigned to another subscriber. The system then returns to step 74 and continues to check for available channels.

If, however, at step 76 it is determined that the user is the highest priority user with a call request in the queue, then the available channel is assigned to the user at step 79. At step 80, the system continues with call processing. Any time that the user's call request is in the queue, and the user decides to cancel the PACA call, the call request is removed from the queue, and the user alerted that the call attempt has been cancelled.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A system for providing a mobile telephone user with priority access to a cellular telecommunications network having a plurality of subscribers, and assigning a channel to said user on a priority basis when there is channel congestion in said network, said system comprising:

means for determining a priority level for said user and each of said plurality of subscribers, said means for determining a priority level including:

means for determining whether said user and each of said plurality of subscribers is designated as a priority access and channel assignment (PACA) user;

a first prioritization parameter associated with said user and each of said plurality of subscribers, said first prioritization parameter indicating whether said user and each of said plurality of subscribers has activated a priority access and channel assignment feature; and a second prioritization parameter associated with said user and each of said plurality of subscribers, said second prioritization parameter indicating a relative priority level for said user and each of said subscribers who has activated said priority access and channel assignment feature;

means for determining a level of channel congestion;

means for reserving a bank of channels;

means for queuing call requests from said user and said plurality of subscribers; and means for selectively assigning a reserved channel to said user, or queuing a call request from the user with call requests from said plurality of subscribers, while awaiting an available channel.

2. The system of claim 1 wherein said means for reserving a bank of channels includes means for reserving said bank of channels solely for the use of said subscribers who have activated said priority access and channel assignment feature.

3. The system of claim 2 wherein said means for queuing call requests from said user and said plurality of subscribers includes means for enabling any channel in said network to be assigned to said user and any of said plurality of subscribers by preventing reservation of said bank of channels.

4. The system of claim 3 wherein said means for selectively assigning a reserved channel to said user, or queuing a call request from the user with call requests from others of said plurality of subscribers includes means for a service provider to designate whether to utilize a reserved bank of channels or a queue technique.

5. The system of claim 4 wherein said means for queuing call requests from said user and said plurality of subscribers includes means for queuing call requests from said user and each of said plurality of subscribers who has activated said priority access and channel assignment feature during a period of channel congestion to await an available channel.

6. The system of claim 5 wherein said means for queuing call requests from said user and said plurality of subscribers who have activated said priority access and channel assignment feature during periods of congestion includes means for assigning an available channel first to the subscriber with the highest priority among those awaiting an available channel.

7. The system of claim 6 wherein said means for queuing call requests from said user and said plurality of subscribers who have activated said priority access and channel assignment feature during periods of congestion includes means for assigning available channels to subscribers with equivalent priority on a first-come, first-served basis.

8. A method of providing a mobile telephone user with priority access to a cellular telecommunications network having a plurality of subscribers, and assigning a channel to said user on a priority basis when there is channel congestion in said network, said method comprising the steps of:

determining a priority level for said user and each of said plurality of subscribers, said step of determining a priority level including the steps of:

determining whether said user and each of said plurality of subscribers is designated as a priority access and channel assignment (PACA) user;

associating a first prioritization parameter with said user and each of said plurality of subscribers, said first prioritization parameter indicating whether said user and each of said plurality of subscribers has activated a priority access and channel assignment feature; and associating a second prioritization parameter with said user and each of said plurality of subscribers, said second prioritization parameter indicating a relative priority level for said user and each of said subscribers who has activated said priority access and channel assignment feature;

determining a level of channel congestion;

reserving a bank of channels;

queuing call requests from said user and said plurality of subscribers; and selectively assigning a reserved channel to said user, or queuing a call request from the user with call requests from said plurality of subscribers, while awaiting an available channel.

9. The method of claim 8 wherein said step of reserving a bank of channels includes reserving said bank of channels solely for the use of said subscribers who have activated said priority access and channel assignment feature.

10. The method of claim 9 wherein said step of queuing call requests from said user and said plurality of subscribers includes enabling any channel in said network to be assigned to said user and any of said plurality of subscribers by preventing reservation of said bank of channels.

11. The method of claim 10 wherein said step of selectively assigning a reserved channel to said user, or queuing a call request from the user with call requests from others of said plurality of subscribers includes enabling a service provider to designate whether to utilize a reserved bank of channels or a queue technique.

12. The method of claim 11 wherein said step of queuing call requests from said user and said plurality of subscribers includes queuing call requests from said user and each of said plurality of subscribers who has activated said priority access and channel assignment feature during a period of channel congestion to await an available channel.

13. The method of claim 12 wherein said step of queuing call requests from said user and said plurality of subscribers who have activated said priority access and channel assignment feature during periods of congestion includes assigning an available channel first to the subscriber with the highest priority among those awaiting an available channel.

14. The method of claim 13 wherein said step of queuing call requests from said user and said plurality of subscribers who have activated said priority access and channel assignment feature during periods of congestion includes assigning available channels to subscribers with equivalent priority on a first-come, first-served basis.

15. A method of processing a call request for a priority access and channel assignment (PACA) call from a mobile telephone user in a cellular telecommunications network having a plurality of subscribers, said method comprising the steps of:

receiving said call request from said user;

determining whether there is channel congestion in said network;

assigning a channel to said user upon a determination that there is not channel congestion in said network;

enabling a service provider to designate whether to utilize a reserved bank of channels or a queue technique for subscriber access and channel assignment during periods of channel congestion;

reserving a bank of channels for priority users when said service provider designates to utilize a reserved bank of channels;

determining whether a reserved channel is available;

assigning a reserved channel to said user upon a determination that a reserved channel is available;

determining, upon a determination that a reserved channel is not available, whether said service provider has designated that said queue technique is to be utilized when a reserved channel is not available;

denying access to said user upon a determination that said service provider has not designated that said queue technique is to be utilized;

positioning, upon a determination that said service provider has designated that said queue technique is to be utilized, said user's PACA call request in priority order with call requests from said plurality of subscribers, according to each subscriber's priority level and time of arrival at said queue of each of said call requests;

determining whether said user's PACA call request will fit in a queue, based on a predefined queue size;

determining, upon a determination that said user's PACA call request will not fit in said queue, whether said service provider has designated that said reserved bank of channels is to be utilized when said user's PACA call request will not fit in said queue;

denying access to said user upon a determination that said service provider has not designated that said reserved bank of channels is to be utilized;

determining whether a reserved channel is available upon a determination that said service provider has designated that said reserved bank of channels is to be utilized;

determining, upon a determination that said user's PACA call request is in said queue, whether a channel is available;

determining, upon a determination that a channel is available, whether said user is the highest priority subscriber in said queue;

assigning, upon a determination that said user is not the highest priority subscriber in said queue, a channel to a queued subscriber with the highest priority level and earliest time of arrival within said subscriber's priority level; and assigning a channel to said user upon a determination that said user is the highest priority subscriber in said queue.

* * * * *

UNITED STATES PATENT AND TRADEMARK OFFICE
CERTIFICATE OF CORRECTION

PATENT NO. : 5,574,977

DATED : November 12, 1996

INVENTOR(S) : Robin S. Joseph and Michel Houde

It is certified that error appears in the above-identified patent and that said Letters Patent are hereby corrected as shown below:

On the cover page at [75] Inventors:
  Change "Michael Houde" to --Michel Houde--.

Signed and Sealed this

Fifteenth Day of April, 1997

*Attest:*

BRUCE LEHMAN

*Attesting Officer*     *Commissioner of Patents and Trademarks*